US012615320B1

(12) United States Patent
Still et al.

(10) Patent No.: US 12,615,320 B1
(45) Date of Patent: Apr. 28, 2026

(54) METHOD FOR EFFICIENT DATA TRANSMISSION USING PARALLEL CHANNELS

(71) Applicant: Avreo, Inc, North Charleston, SC (US)

(72) Inventors: Jonah Still, North Charleston, SC (US); Gautam Agrawal, North Charleston, SC (US); John Lucak, North Charleston, SC (US)

(73) Assignee: Avreo, Inc, North Charleston, SC (US)

( * ) Notice: Subject to any disclaimer, the term of this patent is extended or adjusted under 35 U.S.C. 154(b) by 0 days.

(21) Appl. No.: 19/087,244

(22) Filed: Mar. 21, 2025

(51) Int. Cl.
*H04Q 5/22* (2006.01)
*H04L 69/14* (2022.01)
*H04L 69/16* (2022.01)

(52) U.S. Cl.
CPC ............ *H04L 69/14* (2013.01); *H04L 69/161* (2013.01)

(58) Field of Classification Search
CPC .............................. H04W 76/15; H04W 72/51
See application file for complete search history.

(56) References Cited

U.S. PATENT DOCUMENTS

| | | | | |
|---|---|---|---|---|
| 6,950,868 B1 * | 9/2005 | Faraldo, II | ............ | H04L 67/535 714/E11.193 |
| 2004/0192312 A1 * | 9/2004 | Li | ..................... | H04W 28/0273 455/445 |

| | | | | |
|---|---|---|---|---|
| 2005/0101270 A1 * | 5/2005 | Whitehead | ............ | H04L 67/025 455/131 |
| 2009/0174960 A1 * | 7/2009 | Koeppe | ................... | G06F 21/62 360/53 |
| 2009/0224884 A1 * | 9/2009 | Tuttle | .................. | G06K 7/0008 340/10.1 |
| 2011/0107083 A1 * | 5/2011 | Nomura | ............. | H04N 21/4405 713/150 |
| 2016/0020968 A1 * | 1/2016 | Aumann | ............. | H04L 43/0888 370/252 |
| 2017/0013287 A1 * | 1/2017 | Rothaus | .................. | H04N 7/20 |
| 2021/0321267 A1 * | 10/2021 | Kim | ..................... | H04B 7/0408 |
| 2021/0336725 A1 * | 10/2021 | Zhou | ..................... | H04L 1/1845 |
| 2024/0313937 A1 * | 9/2024 | Mu | ........................... | H04L 1/18 |

* cited by examiner

*Primary Examiner* — Zhiren Qin

(74) *Attorney, Agent, or Firm* — AdamsIP, LLC; Edward Brinkley Garner, III; James Hunter Adams

(57) ABSTRACT

The present disclosure provides a system for transferring data comprising a plurality of parallel transmission channels including at least one command channel and at least two data transmission channels. A sending component receives a data transmission request for a block of content, creates a transmission recipe, divides the content into data elements according to the recipe, and transmits the elements and recipe via the channels using TCP/IP. A receiving component receives the elements and recipe, and reassembles the elements based on the recipe to reconstruct the content. The system enables efficient data transfer with minimal latency while ensuring delivery confirmation, particularly useful for transmitting large data volumes over long distances in applications such as medical imaging, streaming telecommunications, satellite communications, and drone technology.

20 Claims, 9 Drawing Sheets

Change the size of text, apps, and other items

| 350% | ⌄ |

Advanced scaling settings

Display resolution

| 2856 x 2178 (Recommended) | ⌄ |

Display orientation

| Landscape | ⌄ |

FIG. 7

METHOD FOR EFFICIENT DATA TRANSMISSION USING PARALLEL CHANNELS

FIELD OF INVENTION

The subject matter of the present disclosure refers generally to a system and method for data transmission via a plurality of parallel transmission channels.

BACKGROUND

Data transmission over networks has become an integral part of modern technology, enabling the exchange of information across vast distances. As the volume and complexity of data continue to grow, efficient and reliable transmission methods have become increasingly important. Traditional data transmission protocols often struggle to maintain optimal performance when dealing with large data volumes, especially over long distances or in challenging network conditions. One of the primary challenges in data transmission is latency, which refers to the time delay between sending and receiving data. Another key concern in data transmission is throughput, which represents the amount of data that can be transmitted over a network in a given time period. Maximizing throughput is crucial for applications that involve transferring large volumes of data, such as medical imaging, video streaming, or satellite communications. However, achieving high throughput while maintaining data integrity and minimizing latency can be challenging, especially when dealing with network congestion or unreliable connections.

Existing data transmission protocols often face limitations when attempting to address these challenges simultaneously. For instance, some protocols prioritize data integrity at the cost of increased latency, while others may sacrifice reliability for speed. Additionally, many current systems lack the flexibility to adapt to changing network conditions or varying data transmission priorities in real-time. The increasing diversity of data transmission scenarios further complicates the issue. Different applications may have vastly different requirements in terms of speed, reliability, and security. For example, medical imaging applications may prioritize data integrity and security, while live video streaming may emphasize low latency and high throughput. Developing a transmission system that can effectively cater to these diverse needs while maintaining optimal performance across various network conditions remains a significant challenge.

Accordingly, there is a need in the art for a system and method that may allow for increased throughput without compromising latency.

SUMMARY

A system for transferring data using parallel transmission channels is provided. In one aspect, the system uses parallel transmission channels to efficiently transfer data. In another aspect, the system allows for adaptability in data transmission by using various protocols in combination with the parallel transmission channels. In yet another aspect, the system provides mechanisms for managing various transmission scenarios, such as out-of-order data elements, duplicate data elements, and missing data elements. Generally, the system allows for parallel transmission and reception of data in a way that may enhance efficiency and speed of data transfer. The system comprises a sending component, receiving component, and a plurality of parallel transmission channels operably connected to said sending component and said receiving component. The plurality of parallel transmission channels comprises at least one command channel for transmitting instructions and at least two data transmission channels for transmitting blocks of content. The sending component is configured to receive data transmission requests, create transmission recipes, divide blocks of content into data elements, and transmit these elements and recipes via the parallel channels using TCP/IP. The receiving component is configured to receive the data elements and transmission recipes and subsequently reassemble the data elements based on the transmission recipes in order to reconstruct the original content.

The system may be configured to function over HTTP and HTTPS protocols, enhancing its compatibility with existing network infrastructures. It can dynamically switch between these protocols based on factors such as data sensitivity and network conditions, optimizing performance and security. The system may also support newer protocols like HTTP/2 and HTTP/3 (QUIC) for improved performance in certain scenarios. Further, the system may use multi-threaded approaches, treating each data transmission channel as a separate TCP connection for parallel transmission. The system may implement TCP optimizations such as window scaling, Fast Open, and selective acknowledgment (SACK) to improve throughput and handle packet loss efficiently. It may also use adaptive security measures when using HTTPS, adjusting encryption strength based on data sensitivity and threat levels. The system may also be configured to implement error handling and recovery mechanisms. It can manage out-of-order data elements, eliminate duplicates, and address missing elements. For instance, the receiving component may use the transmission recipe to identify gaps in received data and request retransmission or use error correction techniques to reconstruct missing elements.

The system is preferably configured to be highly adaptable. For instance, the system may be configured to respond to notifications that a current transmission is no longer required and switch to transmitting new requested data. The system may also be configured dynamically adjust the number of data transmission channels based on factors such as data volume and available bandwidth. Some embodiments of the system may employ machine learning algorithms to optimize its operations. These algorithms can analyze historical data on transmission performance, security requirements, and network conditions to make predictive decisions about protocol selection and other transmission parameters. Other embodiments of the system may be configured to implement testing and validation procedures, including cross-validation, A/B testing, etc., to ensure reliability and safety and/or safeguards to prevent potentially harmful decisions by the machine learning component.

The system has wide-ranging applications, particularly in fields requiring the transmission of large data volumes with minimal latency. In medical imaging, it can facilitate rapid transmission of high-resolution images for remote diagnosis. In streaming telecommunications, it can provide smooth, high-quality video experiences. For satellite communications, it can maximize throughput over long distances. In drone technology, it can handle high-volume data transmission under varying operational conditions. Other potential applications include remote sensing, autonomous vehicle communications, high-frequency trading systems, and distributed computing networks. In all these contexts, the system's ability to minimize latency, maximize throughput, and adapt to changing transmission priorities may provide significant advantages over traditional data transmission methods.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

BRIEF DESCRIPTION OF FIGURES

These and other features, aspects, and advantages of the present disclosure will become better understood with regard to the following description, appended claims, and accompanying drawings where:

FIG. 7 illustrates an environmental view of a system embodying features consistent with the principles of the present disclosure.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises", and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method capable of managing data transmission in parallel.

Figure 1:
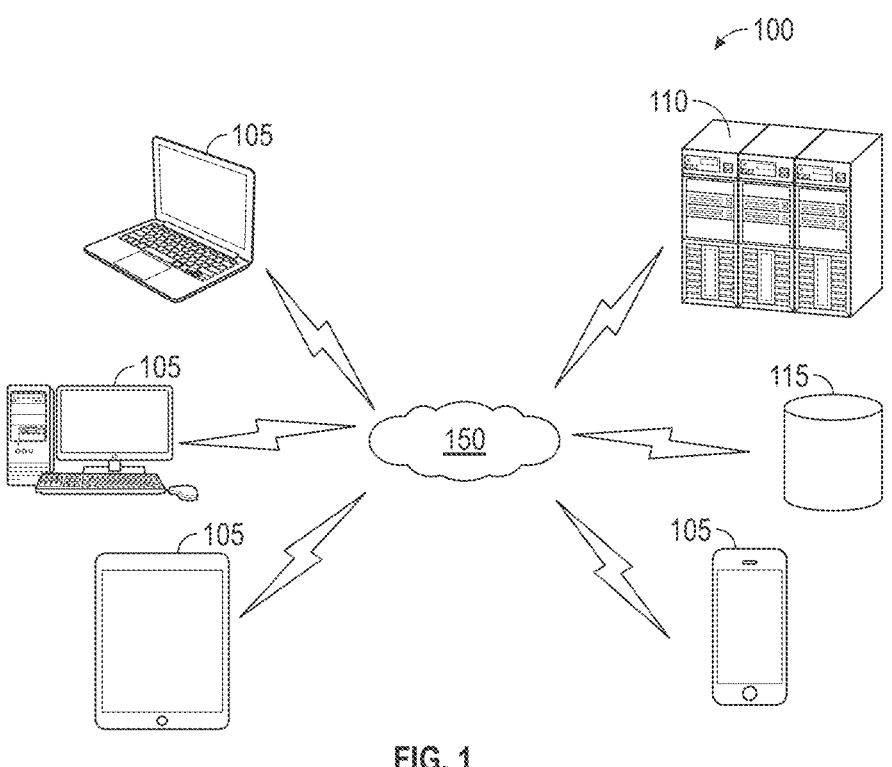
FIG. 1 illustrates a system embodying features consistent with the principles of the present disclosure.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for instance, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for instance, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
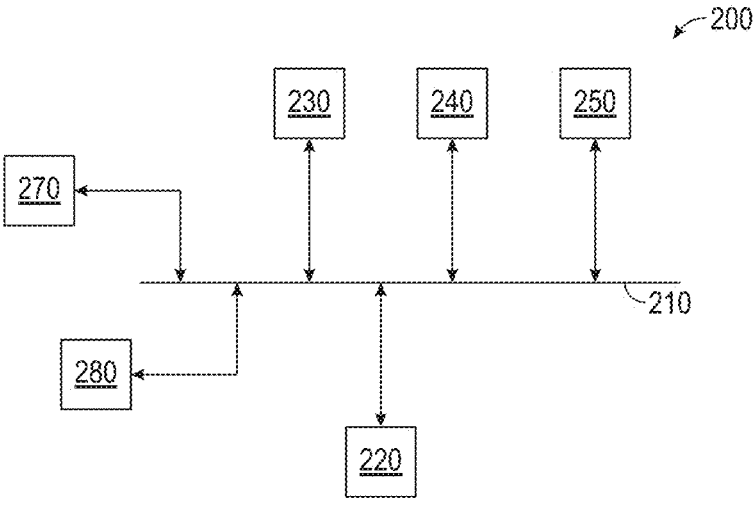
FIG. 2 illustrates a system embodying features consistent with the principles of the present disclosure.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411A, 411B, 511, 711, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
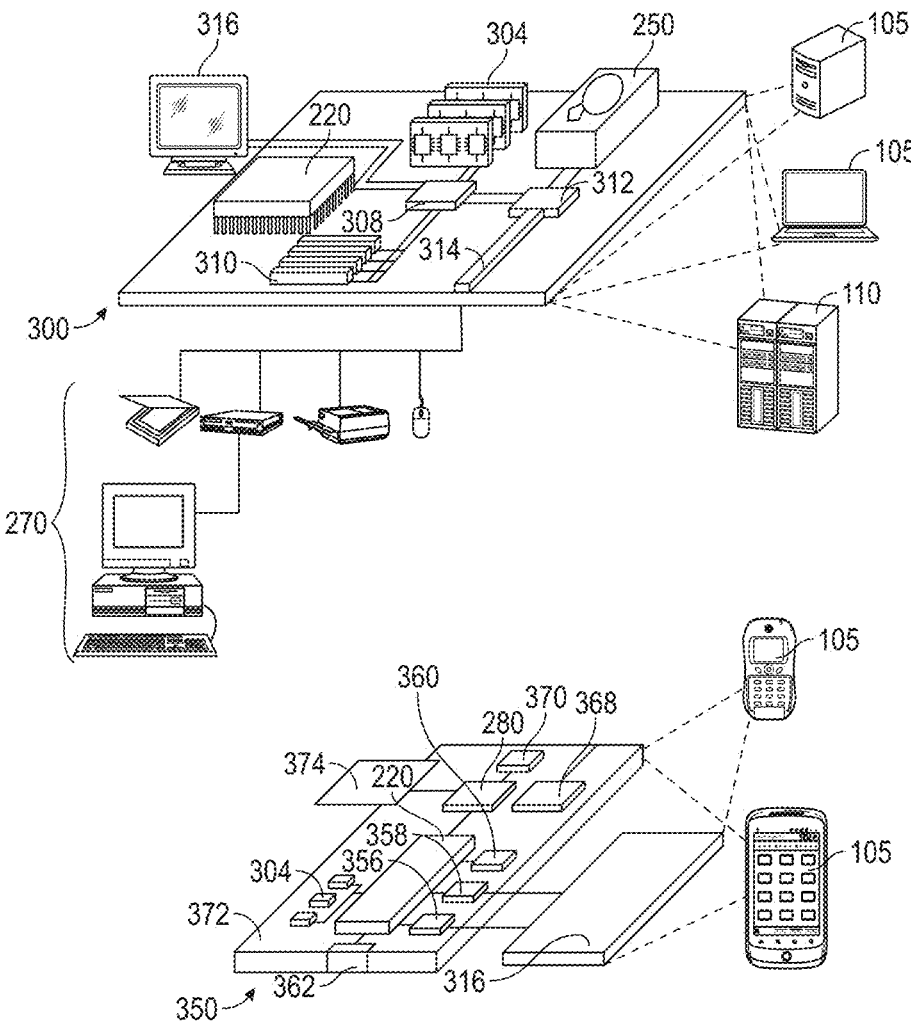
FIG. 3 illustrates a system embodying features consistent with the principles of the present disclosure.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For instance, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411A, 411B, 511, 711, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), holographic displays, augmented reality displays, virtual reality displays, or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. In an embodiment, the power supply may be a stationary power outlet. The system 400 may comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when the power supply is not connected to a stationary power outlet or if the stationary power outlet ceases to provide power to the computing entity 200.

Figure 4:
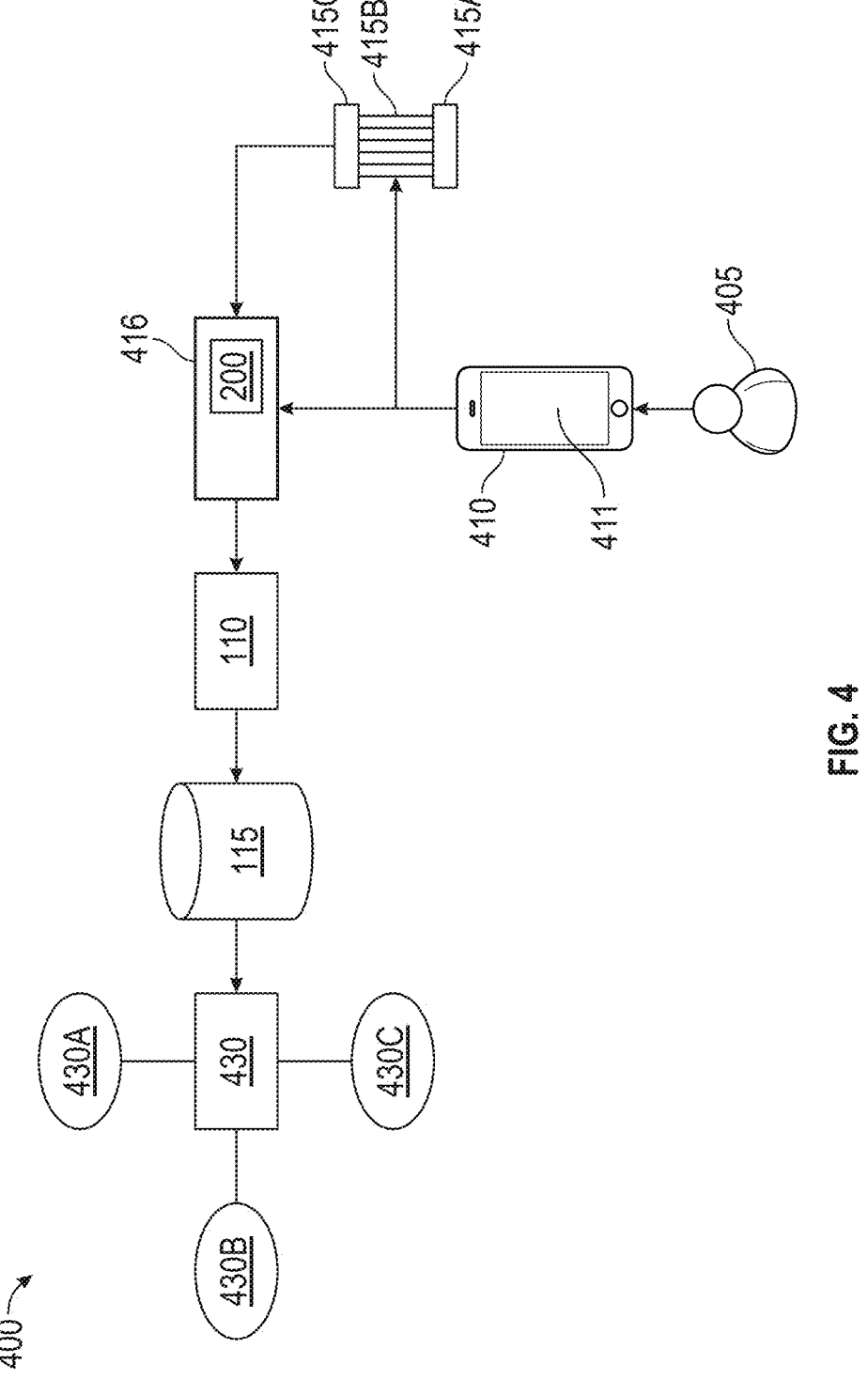
FIG. 4 illustrates a system embodying features consistent with the principles of the present disclosure.
Figure 5:
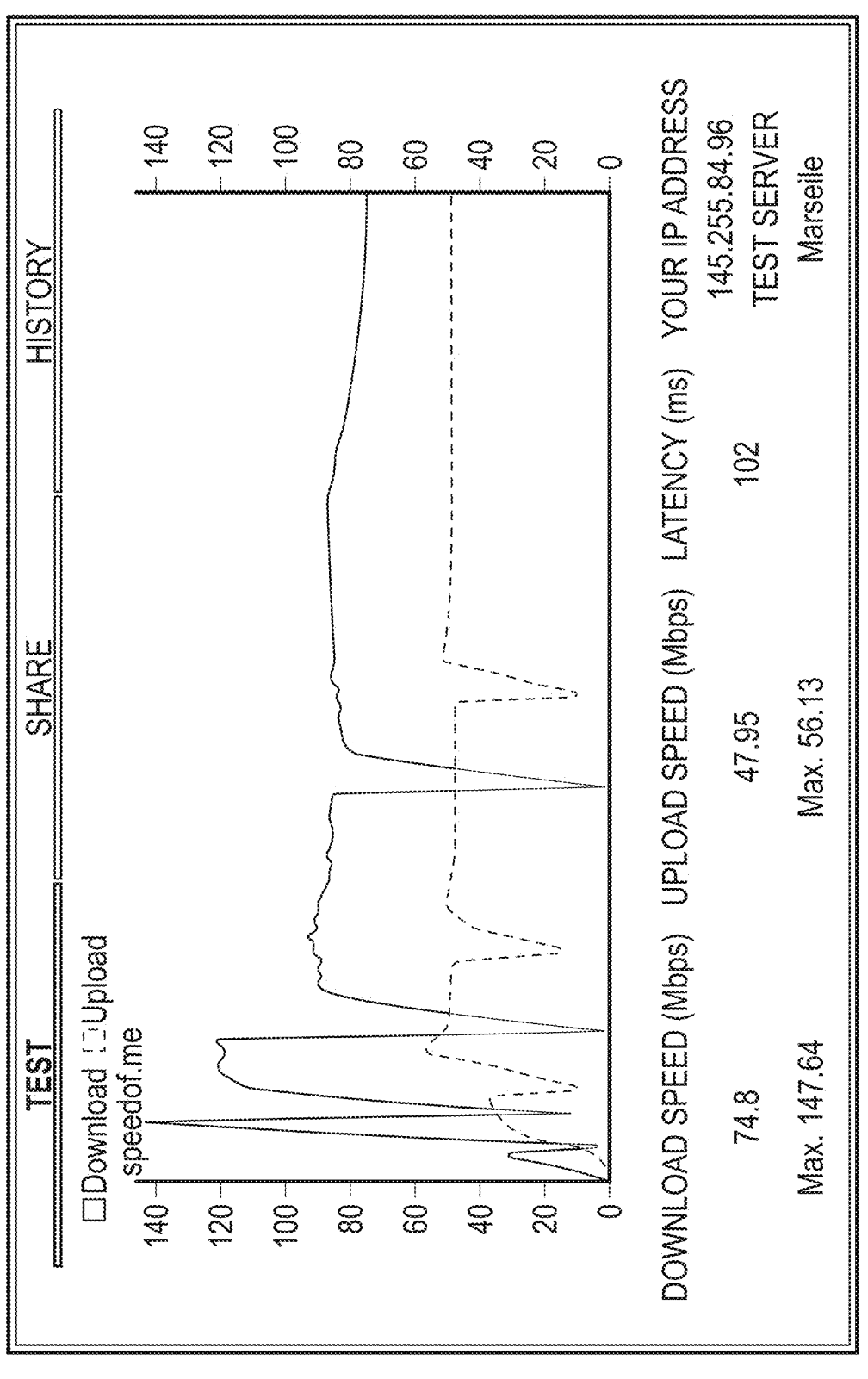
FIG. 5 illustrates a system embodying features consistent with the principles of the present disclosure.
Figure 6:
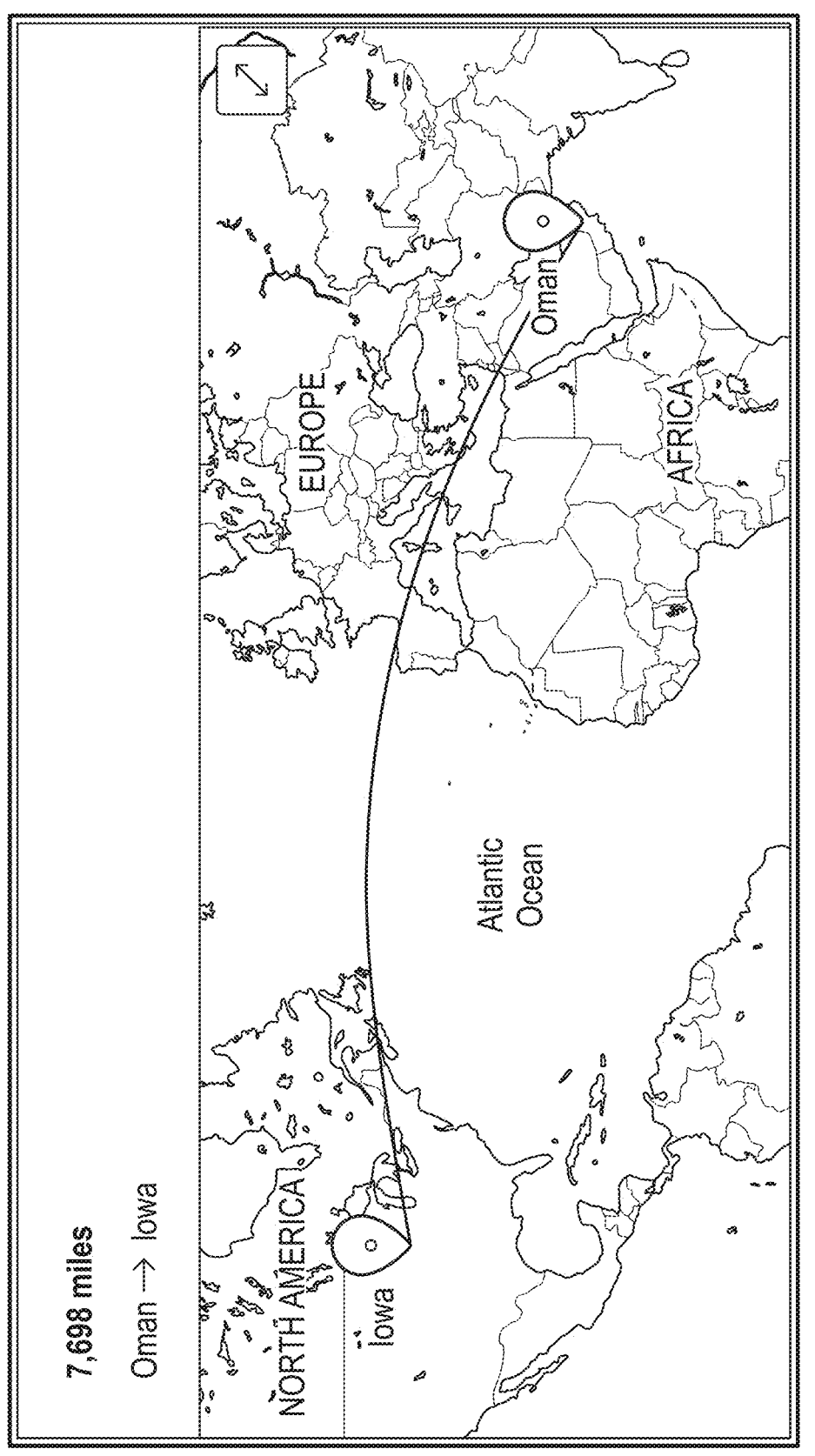
FIG. 6 illustrates a system embodying features consistent with the principles of the present disclosure.
Figure 8:
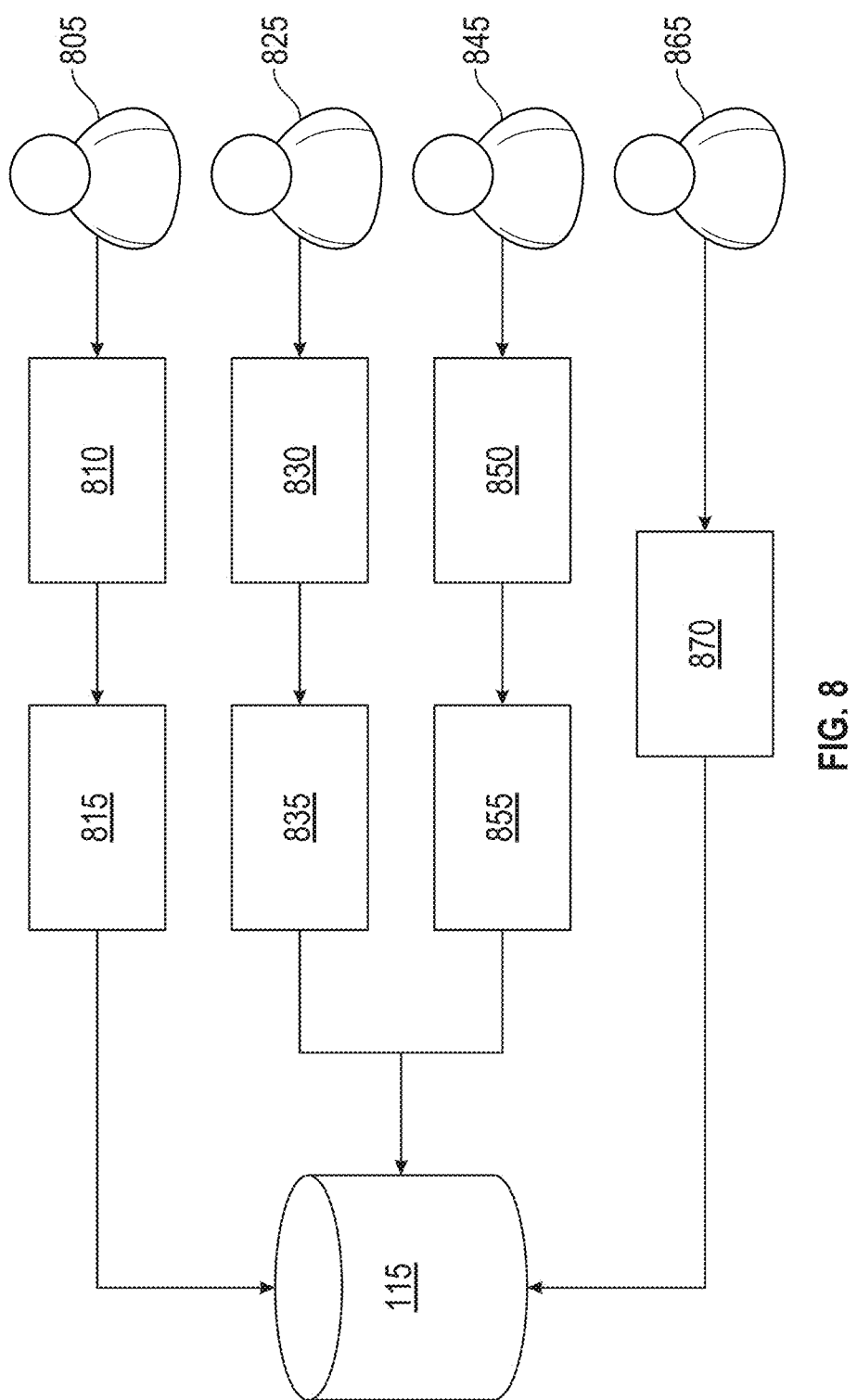
FIG. 8 illustrates the manner in which individual access to data may be granted or limited based on user roles and administrator roles.
Figure 9:
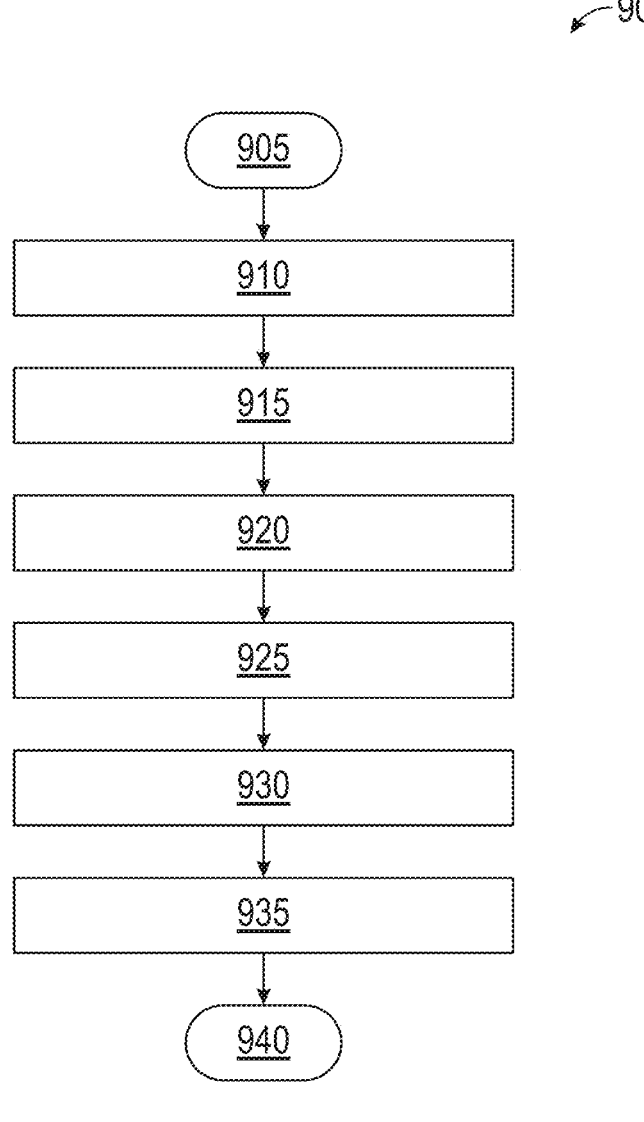
FIG. 9 illustrates a flow chart showing certain method steps of a method embodying features consistent with the principles of the present disclosure.

FIGS. 4-9 illustrate embodiments of a system 400 and methods for efficient data transmission over the internet, particularly for applications requiring the transfer of large volumes of data with minimal latency, such as medical imaging, streaming communications, satellite communications, and drone technology. FIG. 4 illustrates a preferred embodiment of the system 400 having a computing device 410, sending component 415A, and receiving component 415C. FIG. 5 illustrates an example user interface 411 of a computing device 410 sending data via the sending component 415A. FIG. 6 illustrates an example user interface 411 of a computing device 410 receiving data via the receiving component 415C. FIG. 7 illustrates an environmental view of the system 400 being used by a user 405. FIG. 8 illustrates permission levels 800 that may be utilized by the present system 400 for controlling access to user content 815, 835, 855 such as user data 430A, patient data 430B, image data 430C. FIG. 9 illustrates a method that may be carried out by the system 400. It is understood that the various method steps associated with the methods of the present disclosure may be carried out as operations by the system 400 shown in FIG. 4.

The system 400 generally comprises a plurality of parallel transmission channels 415B, sending component 415A, receiving component 415C, computing entity 200, processor 220 operably connected to said plurality of parallel transmission channels 415B, sending component 415A, receiving component 415C, and computing entity 200, and a non-transitory computer readable medium coupled to the processor 220 and having instructions stored thereon. The parallel transmission channels 415B include at least one command channel for transmitting instructions and at least two data transmission channels 415B for transmitting blocks of content. The sending component 415A, operably connected to the parallel transmission channels 415B, is configured to receive a data transmission request from a computing entity 200. Upon receipt of the request, the sending component 415A creates a transmission recipe for the requested data block, divides the data block into smaller data elements according to the recipe, and transmits these data elements along with the transmission recipe via the parallel transmission channels 415B using the Transmission Control Protocol/Internet Protocol (TCP/IP). The receiving component 415C, also operably connected to the parallel transmission channels 415B and the sending component 415A, is configured to receive the transmitted data elements and the transmission recipe. It then reassembles the data elements based on the transmission recipe to reconstruct the original data block.

The parallel transmission channels 415B are configured to facilitate the transmission of data from the sending component 415A to the receiving component 415C. The parallel transmission channels 415B may include at least one command channel and at least two data transmission channels 415B. The command channel may be configured to transmit instructions related to the data transmission. These instructions may include, but are not limited to, commands for initiating or terminating data transmission, adjusting the rate of data transmission, or changing the data transmission path. In some cases, the command channel may also be used to transmit control signals or other types of non-data information. For instance, the command channel may transmit status information about the sending or receiving component 415C, error messages, or other types of diagnostic or operational information. The command channel may operate independently of the data transmission channels 415B, allowing it to transmit instructions or other information without interrupting or slowing down the data transmission.

The data transmission channels 415B may be configured to transmit blocks of content. These blocks of content may include the data elements that have been divided according to the transmission recipe created by the sending component 415A. The data transmission channels 415B may operate in parallel, allowing multiple data elements to be transmitted simultaneously. This parallel operation may significantly increase the speed and efficiency of data transmission, especially when transmitting large volumes of data over long distances, as illustrated in FIG. 6. In some embodiments, the number of data transmission channels 415B may be dynamically adjusted based on the volume of data to be transmitted, the available network bandwidth, or other factors. For instance, if a large volume of data needs to be transmitted quickly, the system 400 may increase the number of data transmission channels 415B to allow more data elements to be transmitted in parallel. Conversely, if the network bandwidth is limited, the system 400 may reduce the number of data transmission channels 415B to avoid overloading the network.

In some cases, the data transmission channels 415B may be configured to transmit data elements using the Transmission Control Protocol/Internet Protocol (TCP/IP), which the system 400 may utilize TCP/IP in several ways to enhance the efficiency and reliability of data transmission. This protocol provides a robust standard for communication that guarantees the delivery of the content from the sender to the receiver. Despite the overhead of communication associated with TCP/IP, the parallel operation of the data transmission channels 415B may help to minimize latency and maximize the throughput of the available internet connection. In one preferred embodiment, the system 400 may implement a multi-threaded approach, where each data transmission channel operates as a separate TCP connection, allowing for parallel transmission of data elements and potentially increasing overall throughput. In another preferred embodiment, system 400 may employ TCP's congestion control mechanisms to dynamically adjust the transmission rate of each channel, which may help optimize the use of available bandwidth while avoiding network congestion.

In another preferred embodiment, the system 400 may leverage TCP's built-in error detection and correction capabilities to ensure data integrity during transmission. To further enhance performance, the system 400 may implement TCP optimizations such as TCP window scaling, which allows for larger receive windows and potentially higher throughput over high-latency connections. The system 400 may also use TCP Fast Open to reduce connection establishment time for subsequent data transmissions. In other preferred embodiments, the system 400 may utilize TCP's selective acknowledgment (SACK) option to more efficiently handle packet loss and retransmission. This can be particularly beneficial when transmitting large volumes of data over networks with varying levels of reliability. Further, the system 400 may also employ TCP pipelining techniques, allowing multiple data elements to be sent without waiting for acknowledgments from the receiving component 415C, which may help reduce the impact of network latency on overall transmission speed. To address potential issues with TCP's head-of-line blocking, where a lost packet can delay the delivery of subsequent packets, the system 400 may implement strategies such as using multiple TCP connections per data transmission channel or exploring TCP variants designed to mitigate this issue. As illustrated in FIG. 5, some embodiments of the system 400 may allow a user 405 to view changes in upload/download speed as these strategies are employed by the system 400 designed to mitigate packet issues.

The parallel transmission channels 415B may be implemented using various physical and logical components of network infrastructure. In a preferred embodiment, the transmission channels 415B comprise physical communication mediums, such as fiber optic cables, coaxial cables, twisted pair cables, or wireless radio frequency links. These physical mediums may provide the underlying infrastructure for data transmission. In other preferred embodiments, the transmission channels 415B may be implemented as logical connections over existing network infrastructure. For example, they may be virtual circuits or tunnels established over a shared physical network. The system 400 may also utilize technologies like Virtual Local Area Networks (VLANs) or Multi-Protocol Label Switching (MPLS) to create separate logical channels for data transmission or by using software-defined networking (SDN) techniques. In the case of SDN techniques, the parallel transmission channels 415B may be dynamically created and managed by network controllers, allowing for flexible allocation of network resources based on transmission needs. In yet another preferred embodiment, the parallel transmission channels 415B may be made of a combination of dedicated hardware and software components. For instance, specialized network interface cards (NICs) may be used to handle the parallel data streams, while software protocols manage the logical separation and coordination of these streams. The system 400 may also utilize cloud-based networking services to create and manage the parallel transmission channels 415B. For example, the parallel transmission channels 415B may be implemented as virtual network functions (VNFs) running on cloud infrastructure, providing scalability and flexibility in channel allocation and management.

In a preferred embodiment, the sending component 415A is operably connected to the parallel transmission channels 415B and to the receiving component 415C via said parallel transmission channels 415B. In some preferred embodiments, the sending component 415A may be configured to receive a data transmission request from a computing entity 200 operably connected to the sending component 415A, wherein the data transmission request pertains to a block of content that needs to be transmitted, such as patient data 430B in the form of image data 430C. This block of content may be any type of data or information that can be transmitted over a network, such as a file, a data packet, a stream of data, or a set of data packets. The block of content may be large or small in size, and may be of any data type, such as text, image, audio, video, or a combination thereof. In some cases, the sending component 415A may manage the transmission of data elements over the parallel transmission channels 415B in a highly efficient manner. In some preferred embodiments, the communication protocol used by the sending component 415A may have a ratio of overhead to data very close to 1. This means that the amount of overhead, or non-data information, transmitted along with the data elements is minimal compared to the amount of actual data transmitted. This high efficiency may reduce the bandwidth requirements and increase the speed of data transmission, especially when transmitting large volumes of data over long distances.

Upon receipt of the data transmission request, the sending component 415A may be configured to create a transmission recipe for the block of content. The transmission recipe is a set of instructions or parameters that dictate how the block of content is divided into smaller data elements for transmission. The transmission recipe may take into account various factors, such as the size of the block of content, the available network bandwidth, the capabilities of the receiving component 415C, or other factors. In one preferred embodiment, the transmission recipe may specify the size or number of the data elements, the order in which they are transmitted, the data transmission channels 415B to be used, or other aspects of the data transmission. In some preferred embodiments, the sending component 415A may dynamically adjust the transmission recipe based on changes in the network conditions, the data transmission request, or other factors. For instance, if the network bandwidth increases, the sending component 415A may adjust the transmission recipe to divide the block of content into larger data elements, thereby taking advantage of the increased bandwidth. Conversely, if the network bandwidth decreases, the sending component 415A may adjust the transmission recipe to divide the block of content into smaller data elements, thereby avoiding network congestion or data loss.

Once the sending component 415A has created the transmission recipe, it may then divide the block of content into data elements according to the transmission recipe. Data elements may be defined as smaller pieces of the block of content that can be transmitted individually over the network, wherein the size and number of the data elements may be determined by the transmission recipe. The data elements may be transmitted in a specific order, randomly, or based on a priority scheme, as dictated by the transmission recipe. In some embodiments, the sending component 415A may use various techniques or algorithms to divide the block of content into data elements, such as segmentation, fragmentation, packetization, or other techniques. In other embodiments, the sending component 415A may be configured to adapt the transmission recipe or the division of the block of content into data elements based on feedback from the receiving component 415C or based on changes in the data transmission request. For instance, if the receiving component 415C indicates that it is receiving the data elements out of order or that some data elements are missing, the sending component 415A may adjust the transmission recipe or the division of the block of content to address these issues. In some embodiments, the sending component 415A may also be configured to adapt the division of the block of content into data elements based on feedback from the receiving component 415C. For instance, if the receiving component 415C indicates that it is receiving the data elements out of order or that some data elements are missing, the sending component 415A may adjust the division of the block of content to address these issues. This adaptability of the sending component 415A may enhance the efficiency and reliability of the data transmission, especially in dynamic or unpredictable network environments.

Similarly, if the data transmission request changes, such as if a different block of content is now requested, the sending component 415A may adapt the transmission of data elements and the transmission recipe accordingly. In a preferred embodiment, when a new block of content is requested, the sending component 415A may pause the ongoing transmission of the original block of content, ensuring that network resources are not wasted on transmitting data that is no longer needed. It may then analyze the characteristics of the newly requested block of content, such as its size, data type, and priority level. Based on this analysis, the sending component 415A may create a new transmission recipe tailored to the characteristics of the new block of content. This new recipe may specify different parameters compared to the original, such as a different number or size of data elements, a different order of transmission, or the use of different data transmission channels 415B. The system 400 may also reassess the current network conditions and available resources. If the new block of content is larger or requires faster transmission, the system 400 may increase the number of parallel transmission channels 415B or allocate more bandwidth to the transmission. Conversely, if the new block is smaller or less urgent, the system 400 may reduce the resources allocated to the transmission.

In some embodiments, the system 400 may implement a priority scheme. If the newly requested block of content is deemed more urgent than the original, the system 400 may immediately begin transmitting the new block, potentially interrupting the transmission of any remaining data elements from the original block. Alternatively, if the new block is less urgent, the system 400 may queue it for transmission after the current block is completed. The sending component 415A may also adapt its error handling and retransmission strategies based on the characteristics of the new block of content. For instance, if the new block contains critical data that cannot tolerate any loss, the system 400 may implement more robust error checking and correction mechanisms. Furthermore, the system 400 may communicate these changes to the receiving component 415C via the command channel. This may include sending a new transmission recipe, notifying the receiving component 415C to expect a different block of content, or providing instructions on how to handle any partially received data from the original transmission.

In some embodiments, the system 400 may be configured to send both a new block of content and the original block of content simultaneously. This capability may be particularly useful in scenarios where both sets of data are required, or when the system 400 needs to ensure that all requested data is transmitted without interruption. To achieve simultaneous transmission of both the new and original blocks of content, the system 400 may utilize its parallel transmission channels 415B in a more sophisticated manner. The sending component 415A may create separate transmission recipes for each block of content, allocating different sets of data transmission channels 415B for each block. This approach may allow for the concurrent transmission of both blocks without interference.

In one preferred embodiment, the system 400 may dynamically adjust the allocation of transmission channels 415B based on the priority and size of each block. For instance, if the new block of content is deemed more urgent, it may be assigned a larger number of data transmission channels 415B to expedite its delivery. The remaining channels may continue to transmit the original block of content, albeit at a potentially slower rate. The system 400 may also employ adaptive scheduling algorithms to interleave the transmission of data elements from both blocks. This interleaving may be done at the packet level, allowing for fine-grained control over the transmission process. The scheduling algorithm may take into account factors such as the relative priorities of the blocks, network conditions, and the progress of each transmission.

To manage the increased complexity of transmitting two blocks simultaneously, the system 400 may utilize the command channel to send additional metadata and control information. This may include separate transmission recipes for each block, identifiers to distinguish between data elements from different blocks, and instructions for the receiving component 415C on how to handle the parallel streams of data. In a preferred embodiment, the receiving component 415C may be configured in a way such that it may handle the simultaneous reception of multiple blocks of content. In one preferred embodiment, the receiving component 415C may maintain separate reassembly buffers for each block, using the metadata provided via the command channel to correctly sort and reassemble the incoming data elements. This approach may allow the receiving component 415C to reconstruct both blocks of content concurrently, potentially improving overall system efficiency.

In some cases, the system 400 may implement a dynamic prioritization scheme that adjusts the transmission rates of the two blocks in real-time based on changing conditions or requirements. For example, if the importance of the original block suddenly increases during transmission, the system 400 may reallocate more resources to its transmission without completely halting the transmission of the new block. The simultaneous transmission capability may also be leveraged to implement a form of redundancy or error recovery. In scenarios where data integrity is critical, the system 400 may transmit the same block of content twice, using different encoding or transmission strategies for each instance. This approach may provide an additional layer of reliability, allowing the receiving component 415C to recover from errors or packet loss by comparing the two received versions of the block.

As previously mentioned, the sending component 415A is configured to divide the block of content into data elements. In a preferred embodiment, the process of dividing the block of content into data elements according to the transmission recipe may involve various steps and techniques. For instance the sending component 415A may first analyze the block of content to determine its size, data type, and other characteristics. Based on this analysis, the sending component 415A may create a transmission recipe that specifies how the block of content should be divided into data elements. The sending component 415A may then divide the block of content into data elements according to the transmission recipe. The size and number of the data elements are preferably determined by the transmission recipe. For instance, if the block of content is a large file, the sending component 415A may divide it into many small data elements to facilitate faster transmission. Conversely, if the block of content is a small file, the sending component 415A may divide it into fewer, larger data elements to reduce the overhead of data transmission. The sending component 415A may then monitor the transmission and dynamically adjust the division of the block of content into data elements based on changes in various factors.

In a preferred embodiment, the receiving component 415C is configured to receive the data elements and the transmission recipe via the parallel transmission channels 415B. The receiving component 415C may be operably connected to the parallel transmission channels 415B and the sending component 415A, allowing it to receive the data elements and the transmission recipe transmitted by the sending component 415A. The receiving component 415C is preferably designed to handle various network protocols and data formats, allowing it to adapt to different types of incoming data. The receiving component 415C may support multiple communication interfaces, such as Ethernet, Wi-Fi, cellular networks, or satellite links, enabling it to receive data from diverse sources and across various network infrastructures. In some preferred embodiments, the receiving component 415C may implement advanced buffering techniques to manage the incoming data elements efficiently. These buffers may be ally allocated based on the size and complexity of the incoming data, allowing the receiving component 415C to optimize memory usage and processing speed. In one preferred embodiment, the receiving component 415C may employ predictive buffering, anticipating the arrival of specific data elements based on the transmission recipe and pre-allocating resources accordingly.

To enhance reliability, the receiving component 415C may implement error detection and correction mechanisms. These may include cyclic redundancy checks (CRC), forward error correction (FEC), or more advanced techniques like Reed-Solomon codes. Such mechanisms may allow the receiving component 415C to identify and potentially correct errors in the received data elements without requiring retransmission, thereby improving overall system efficiency. The receiving component 415C may also incorporate adaptive flow control mechanisms. These mechanisms may allow the receiving component 415C to regulate the rate at which it receives data elements from the sending component 415A, preventing buffer overflows and ensuring optimal processing of incoming data. The flow control may be dynamically adjusted based on factors such as available processing power, memory resources, and the complexity of the incoming data.

In some embodiments, the receiving component 415C may implement a multi-threaded or parallel processing architecture. This design may allow the receiving component 415C to simultaneously process multiple incoming data streams, reassemble different blocks of content, and perform various data integrity checks as dictated by the transmission recipe. Such parallel processing capabilities may significantly enhance the receiving component 415C's ability to handle high-volume, high-speed data transmissions. The receiving component 415C may also feature advanced security measures to protect the integrity and confidentiality of the received data. These may include encryption protocols, digital signatures, and secure key exchange mechanisms. In some cases, the receiving component 415C may be capable of negotiating security parameters with the sending component 415A in real-time, adapting to different security requirements for various types of data or transmission scenarios. To handle potential network disruptions or inconsistencies, the receiving component 415C preferably comprises error recovery mechanisms, including the ability to request retransmission of specific data elements, to reorder out-of-sequence data elements, and to reconcile conflicting or duplicate data. In a preferred embodiment, the receiving component 415C may maintain a log of received data elements and their order, allowing it to quickly identify and address any discrepancies or missing elements.

In some preferred embodiments, the receiving component 415C may feature a modular design, allowing for easy upgrades or modifications to support new protocols, data formats, or processing algorithms. This modularity may enable the receiving component 415C to adapt to evolving network technologies and data transmission standards without requiring a complete system overhaul. The receiving component 415C may also incorporate advanced diagnostics and monitoring capabilities. These may include real-time performance metrics, error logs, and network analysis tools. Such features may allow system administrators 865 to monitor the health and efficiency of the receiving component 415C, identify potential issues before they become critical, and optimize system performance over time. In scenarios where the receiving component 415C is part of a larger distributed system, it may implement load balancing and failover mechanisms. These features may allow the receiving component 415C to distribute incoming data across multiple processing units or even multiple physical devices, ensuring optimal resource utilization and providing redundancy in case of hardware failures.

Upon receipt of a plurality of data elements and a transmission recipe pertaining to said plurality of data elements, the receiving component 415C may reassemble the data elements based on the transmission recipe to reconstruct the original block of content. In some cases, the receiving component 415C may receive the data elements and the transmission recipe simultaneously or in a specific order, as dictated by the transmission recipe. The receiving component 415C may use various techniques or algorithms to receive the data elements and the transmission recipe, such as packet reception, fragmentation, reassembly, or other techniques. The receiving component 415C may also handle various transmission scenarios, such as receiving data elements out of order, receiving duplicate data elements, or addressing missing data elements. This may enhance the reliability and integrity of the data transmission, especially in dynamic or unpredictable network environments.

In some embodiments, the receiving component 415C may be configured to reassemble the data elements based on the transmission recipe to reconstruct the original block of content. The reassembly process may involve various steps and techniques, such as reordering the data elements, eliminating duplicate data elements, filling in missing data elements, or other techniques. The reassembly process may be guided by the transmission recipe, which may specify the order and arrangement of the data elements in the original block of content. In some embodiments, the transmission recipe may include detailed instructions for reconstructing the original block of content from the received data elements. This recipe may specify not only the order of the data elements but also their relative positions, sizes, and relationships within the reconstructed content. The recipe may also include metadata about the original content, such as file type, encoding format, or compression method, which may be crucial for accurate reassembly.

The receiving component 415C may employ sophisticated reassembly algorithms that can handle complex scenarios. For instance, it may use adaptive reassembly techniques that can adjust their strategies based on the characteristics of the incoming data and network conditions. These algorithms may be capable of handling out-of-order data elements, identifying and removing duplicates, and requesting retransmission of missing elements. For instance, error correction algorithms may play a significant role in the reassembly process. The receiving component 415C may utilize forward error correction (FEC) techniques, which allow for the reconstruction of lost or corrupted data elements without the need for retransmission. This may be particularly useful in high-latency environments or when dealing with time-sensitive data. Additionally, the system 400 may employ erasure coding techniques, which can reconstruct the original content even if a certain percentage of data elements are lost or corrupted. For instance, the receiving component 415C may use machine learning algorithms to optimize the reassembly process. These algorithms may learn from previous transmissions to predict the most likely arrangement of data elements, potentially speeding up the reassembly process. They may also adapt to patterns in data loss or corruption, allowing the system 400 to preemptively address common issues.

The receiving component 415C may also implement parallel processing techniques to expedite the reassembly process. It may utilize multiple processing cores or even distributed computing resources to simultaneously reassemble different portions of the content. This parallel approach may significantly reduce the overall time required to reconstruct large or complex blocks of content. In scenarios where the original block of content is particularly large or complex, the receiving component 415C may employ a hierarchical reassembly approach. This method may involve first reconstructing smaller sub-blocks of the content and then combining these sub-blocks to form the complete original block. This hierarchical approach may allow for more efficient use of system resources and may facilitate partial access to the content before the entire block is fully reassembled.

The system 400 may also incorporate integrity verification mechanisms into the reassembly process. These may include checksums, hash functions, or digital signatures that allow the receiving component 415C to verify that the reassembled content matches the original block exactly. If any discrepancies are detected, the system 400 may initiate targeted retransmission requests or apply additional error correction techniques. In some embodiments, the receiving component 415C may implement adaptive buffering strategies during the reassembly process. These strategies may dynamically adjust the amount of memory allocated for reassembly based on factors such as the size of the incoming data, system resources, and the complexity of the reassembly task. This adaptive approach may help optimize system performance and resource utilization. The reassembly process may also incorporate real-time feedback mechanisms. The receiving component 415C may continuously communicate with the sending component 415A during reassembly, providing updates on the progress and any issues encountered. This feedback loop may allow the sending component 415A to adjust its transmission strategies in real-time, potentially improving the efficiency and reliability of the overall data transfer process.

In a preferred embodiment, the receiving component 415C may be configured to dynamically adjust the reassembly process based on changes in the network conditions, the data transmission request, or other factors. For instance, if the network bandwidth decreases, the receiving component 415C may adjust the reassembly process to handle smaller or fewer data elements, thereby avoiding data loss or corruption. Conversely, if the network bandwidth increases, the receiving component 415C may adjust the reassembly process to handle larger or more data elements, thereby taking advantage of the increased bandwidth. Similarly, if the data transmission request changes, such as if a different block of content is now requested, the receiving component 415C may adapt the reassembly process accordingly. This adaptability of the receiving component 415C may enhance the efficiency and reliability of the data transmission, especially in dynamic or unpredictable network environments.

The reassembly of a block of content may comprise various steps and techniques. For instance, the receiving component 415C may first be required retrieve the transmission recipe from the sending component 415A, which may contain instructions or parameters for the reassembly of the data elements. The receiving component 415C may then use the transmission recipe as a guide to reassemble the data elements in the correct order and arrangement to reconstruct the original block of content. In some cases, the reassembly process may involve reordering the data elements according to the transmission recipe. For instance, if the data elements are received out of order, the receiving component 415C may use the transmission recipe to determine the correct order of the data elements and rearrange them accordingly. This may ensure that the reconstructed block of content accurately reflects the original block of content, even if the data elements were transmitted and received in a different order. To handle out-of-order data elements, the receiving component 415C may utilize the transmission recipe, which may include information about the intended order of the data elements. Upon receipt of a data element, the receiving component 415C may compare its position in the transmission recipe with the positions of previously received data elements. If the received data element is out of order, the receiving component 415C may store it in a buffer until the missing data elements are received, thereby ensuring that the data elements are reassembled in the correct order.

In some preferred embodiments, the reassembly process may also involve eliminating duplicate data elements. For instance, if the receiving component 415C receives duplicate data elements, it may use the transmission recipe to identify and remove these duplicates. This may prevent the duplication of data in the reconstructed block of content, thereby maintaining the integrity of the original block of content. To handle duplicate data elements, the receiving component 415C may use the transmission recipe to identify and eliminate duplicates. For instance, the receiving component 415C may maintain a record of received data elements, and upon receipt of a new data element, it may check this record to determine if the same data element has already been received. If a duplicate is detected, the receiving component 415C may discard the duplicate data element and continue with the reassembly process.

In other preferred embodiments, the reassembly process may involve filling in missing data elements. For instance, if the receiving component 415C detects that some data elements are missing, it may use the transmission recipe to identify the missing data elements and request retransmission of these elements from the sending component 415A. To address missing data elements, the receiving component 415C may use the transmission recipe to identify any gaps in the sequence of received data elements. If a missing data element is detected, the receiving component 415C may send a retransmission request to the sending component 415A via the command channel, prompting the sending component 415A to retransmit the missing data element. Alternatively, the receiving component 415C may use error correction techniques to reconstruct the missing data elements based on the received data elements and the transmission recipe. This may ensure that the reconstructed block of content is complete and accurate, even if some data elements were lost during transmission.

In a preferred embodiment, the sending component 415A of the system 400 may be configured to receive a notification from a computing device 410 operably connected thereto that a current transmission is no longer required. This notification may be received from the computing entity 200 or from the receiving component 415C. The notification may be transmitted over the command channel or another dedicated control channel or be triggered by various events or conditions, such as a change in the data transmission request, a change in network conditions, a change in the status of the receiving component 415C, or other factors. Upon receipt of the notification, the sending component 415A may take appropriate actions to stop or pause the current transmission. This may involve terminating the transmission of the remaining data elements, closing the data transmission channels 415B, or other actions. The sending component 415A may also send a confirmation message back to the computing entity 200 or the receiving component 415C to acknowledge the receipt of the notification and the termination of the current transmission.

In some preferred embodiments, the sending component 415A may be configured to adapt to transmit new requested data in response to the notification. This adaptability may allow the system 400 to quickly switch from transmitting one block of content to another, thereby enhancing the responsiveness of the system 400 to changing data transmission needs. Upon receipt of the notification and the new data transmission request, the sending component 415A may create a new transmission recipe for the new block of content. This new recipe may specify different parameters compared to the original recipe, such as a different number or size of data elements, a different order of transmission, or the use of different data transmission channels 415B. The sending component 415A may then divide the new block of content into data elements according to the new recipe and begin transmitting these data elements along with the new recipe over the parallel transmission channels 415B.

In some embodiments, the sending component 415A may adapt the transmission of data elements based on the characteristics of the new block of content and the current network conditions. For instance, if the new block of content is larger or requires faster transmission, the sending component 415A may increase the number of data transmission channels 415B or allocate more bandwidth to the transmission. Conversely, if the new block is smaller or less urgent, the sending component 415A may reduce the resources allocated to the transmission. The sending component 415A may also adjust the size or number of the data elements based on the new transmission recipe, ensuring that the data elements are optimally sized for efficient transmission over the available network bandwidth.

In a preferred embodiment, the system 400 may function over HTTP and HTTPS protocols over TCP/IP. HTTP, or Hypertext Transfer Protocol, and HTTPS, or HTTP Secure, are protocols used for transmitting hypertext over the internet. HTTP and HTTPS are application layer protocols, meaning they focus on how information is presented to the user 405, while also managing session and connection coordination. The system's ability to function over these protocols may allow it to be integrated into existing network infrastructures and to leverage the capabilities of these protocols to enhance data transmission.

In some preferred embodiments, the system 400 may use HTTP or HTTPS as the transport protocol for the parallel transmission channels 415B. This may involve encapsulating the data elements and the transmission recipe into HTTP or HTTPS requests or responses, which are then transmitted over the network. The use of HTTP or HTTPS may provide several advantages. For instance, HTTP and HTTPS are widely supported protocols that can pass through most firewalls and proxy servers 110, potentially improving the system's compatibility with various network environments. Additionally, HTTPS includes built-in security features, such as encryption and authentication, which may enhance the confidentiality and integrity of the data transmission.

In other preferred embodiments, the system 400 may use HTTP or HTTPS for control communication, such as transmitting the data transmission requests or the notifications. This may involve encoding these control messages into HTTP or HTTPS requests, which are then sent to the sending or receiving component 415C. The use of HTTP or HTTPS for control communication may allow the system 400 to leverage the stateless nature of these protocols, which can simplify the implementation of the control communication and improve the system's scalability and robustness. In yet other preferred embodiments, the system 400 may use HTTP or HTTPS for both data transmission and control communication. This may involve multiplexing the data elements, the transmission recipe, and the control messages into the same HTTP or HTTPS streams. This approach may allow the system 400 to fully utilize the available network bandwidth and to simplify the network configuration by reducing the number of required protocols.

In another preferred embodiment, the system 400 may support both HTTP and HTTPS and may dynamically switch between them based on the requirements of the data transmission. For instance, the system 400 may use HTTP for transmitting non-sensitive data to maximize transmission speed, and switch to HTTPS for transmitting sensitive data to ensure security. The system 400 may also switch between HTTP and HTTPS based on network conditions, such as network congestion or packet loss rate, to optimize the performance of the data transmission. In some implementations, the system 400 may incorporate a dynamic protocol selection mechanism that continuously evaluates various factors to determine the most appropriate protocol for data transmission. This mechanism may consider factors such as the sensitivity of the data being transmitted, current network conditions, and specific requirements of the data transmission request. For instance, where the system 400 is transmitting a mix of sensitive and non-sensitive data, it may implement a hybrid approach. This approach may involve simultaneously using both HTTP and HTTPS, routing different data elements through the appropriate protocol based on their sensitivity level. The transmission recipe may include metadata tags for each data element, indicating whether it should be transmitted via HTTP or HTTPS. The system 400 may also implement a gradual transition mechanism when switching between protocols. Instead of abruptly changing all transmissions from HTTP to HTTPS or vice versa, the system 400 may gradually shift the proportion of data sent through each protocol. This gradual transition may help maintain overall system stability and prevent sudden drops in transmission performance.

To further optimize performance, the system 400 may implement protocol-specific optimizations. For HTTP transmissions, it may utilize techniques such as header compression, pipelining, and multiplexing to reduce overhead and improve transmission speed. For HTTPS transmissions, the system 400 may employ session resumption, false start, and other TLS optimizations to minimize the performance impact of the added security layer. In some embodiments, the system 400 may support newer protocols such as HTTP/2 and HTTP/3 (QUIC), which offer improved performance characteristics over traditional HTTP/1.1. The system 400 may dynamically select between these protocols based on client support and network conditions, potentially offering significant performance improvements in certain scenarios. The system 400 may also implement adaptive security measures when using HTTPS. For instance, it may dynamically adjust the encryption strength based on the sensitivity of the data being transmitted and the current threat level. This may allow the system 400 to balance security and performance more effectively.

In another preferred embodiment, the system 400 may implement a predictive protocol switching mechanism in situations where network conditions are highly variable. The predictive protocol switching may use real-time network analytics and historical data to anticipate changes in network conditions and preemptively switch protocols to maintain optimal performance. The system 400 may also provide detailed logging and analytics capabilities related to protocol switching. These logs may include information about when and why protocol switches occurred, the impact on transmission performance, and any security-related events. This information may be valuable for system administrators 865 in optimizing the protocol switching rules and for auditing purposes. In multi-user or multi-tenant environments, the system 400 may implement user-specific or tenant-specific protocol policies. These policies may define default protocol preferences, security requirements, and performance thresholds for each user or tenant. The dynamic protocol selection mechanism may then take these policies into account when making switching decisions.

In some preferred embodiments, the system 400 may utilize machine learning algorithms to optimize the protocol selection process. These algorithms may analyze historical data on transmission performance, security requirements, and network conditions to make predictive decisions about when to switch between HTTP and HTTPS. Over time, the system 400 may learn patterns and trends, allowing it to anticipate when a protocol switch may be beneficial even before network conditions or data sensitivity changes occur. The implementation of machine learning algorithms in the protocol selection process may significantly enhance the system's ability to adapt to changing network environments and data transmission requirements. Machine learning algorithms may be configured to process vast amounts of historical data, including metrics such as transmission speed, latency, packet loss rates, and security breach attempts. By analyzing this data, the machine learning models may identify complex patterns and correlations that may not be immediately apparent to human operators or traditional rule-based systems.

In a preferred embodiment, the system 400 may employ supervised learning techniques, where the machine learning models are trained on labeled datasets. These datasets may include historical records of protocol switches, along with the corresponding network conditions, data sensitivity levels, and resulting transmission performance metrics. The models may learn to associate specific combinations of factors with optimal protocol choices, allowing them to make informed decisions in similar future scenarios. In another preferred embodiment, the system 400 may incorporate unsupervised learning algorithms to discover hidden patterns in the data that may not be explicitly labeled. These algorithms may identify clusters of similar network conditions or data transmission requests, potentially revealing new insights into optimal protocol selection strategies. For instance, the system 400 may discover that certain types of data transmissions consistently perform better with a particular protocol, even if this relationship was not previously known or explicitly programmed. In yet another preferred embodiment, reinforcement learning techniques may be employed to continuously improve the system's decision-making process. In this approach, the system 400 may receive feedback on the outcomes of its protocol selection decisions, such as improvements in transmission speed or reductions in security incidents. The reinforcement learning algorithm may use this feedback to adjust its decision-making strategy over time, optimizing for long-term performance improvements rather than short-term gains. The machine learning component of the system 400 may also leverage deep learning neural networks to process and analyze complex, high-dimensional data. These neural networks may be capable of identifying subtle patterns in network behavior and data transmission characteristics that may be difficult or impossible for simpler algorithms to detect. For example, a deep learning model may be able to predict future network congestion based on a combination of current network metrics, historical trends, and external factors such as time of day or upcoming events that may impact network usage.

In some preferred embodiments, the system 400 may utilize ensemble learning methods, combining multiple machine learning algorithms to improve overall prediction accuracy and robustness. This approach may involve using different types of algorithms in parallel, each specializing in detecting different aspects of the protocol selection problem. The system 400 may then use a voting or weighted averaging mechanism to make the final protocol selection decision based on the outputs of these various algorithms. For example, the system 400 may employ an ensemble learning approach that combines a decision tree algorithm, a support vector machine (SVM), and a neural network to make protocol selection decisions. The decision tree algorithm may specialize in analyzing the hierarchical relationships between different network conditions and their impact on protocol performance. The SVM may focus on classifying data sensitivity levels and their corresponding security requirements. The neural network may process complex, time-series data to identify patterns in network behavior over extended periods. When a protocol selection decision needs to be made, each algorithm may provide its recommendation based on its specialized analysis. The decision tree might suggest using HTTPS due to detecting a pattern of increased network congestion. The SVM might recommend HTTP based on classifying the current data transmission as non-sensitive. The neural network might propose HTTPS after identifying a trend of increased security threats during the current time of day. The system 400 may then use a weighted averaging mechanism, where each algorithm's recommendation is assigned a weight based on its historical accuracy in similar situations. The final protocol selection may be determined by the weighted average of these recommendations, potentially resulting in a decision to use HTTPS for the current data transmission. This ensemble approach may allow the system 400 to make more robust and accurate protocol selections by leveraging the strengths of multiple algorithms and mitigating their individual weaknesses.

The machine learning component may also incorporate online learning capabilities, allowing it to adapt to new patterns and trends in real-time. This may be particularly valuable in dynamic network environments where conditions can change rapidly. As new data becomes available, the system 400 may update its models incrementally, ensuring that its decision-making process remains relevant and effective even as network conditions evolve over time. For example, a system 400 operating on a network experiencing frequent fluctuations in traffic patterns and security threats may employee online learning capabilities of the machine learning component to allow it to adapt to these changes in real-time. As the system 400 processes data transmissions, it may continuously monitor network metrics such as latency, throughput, and packet loss rates. It may also track security-related events, such as attempted breaches or unusual traffic patterns. When a sudden spike in network congestion occurs, the system 400 may immediately adjust its protocol selection strategy, perhaps favoring HTTP for non-sensitive data to maintain transmission speed. Simultaneously, if it detects an increase in potential security threats, it may shift more sensitive data transmissions to HTTPS. As these changes occur, the system 400 may update its internal models, adjusting the weights and parameters of its machine learning algorithms. This ongoing learning process may enable the system 400 to refine its decision-making criteria over time, potentially improving its ability to predict and respond to similar network conditions in the future. By continuously adapting to new patterns and trends, the system 400 may maintain optimal performance and security even in highly dynamic network environments.

To enhance the interpretability of the machine learning models, the system 400 may employ explainable AI techniques. These techniques may allow system administrators 865 to understand the reasoning behind specific protocol selection decisions, which may be crucial for troubleshooting, auditing, and refining the system's behavior. For instance, the system 400 may generate human-readable explanations for why it chose to switch from HTTP to HTTPS at a particular moment, citing specific factors that influenced the decision. The machine learning algorithms may also be designed to handle concept drift, where the statistical properties of the target variable (in this case, the optimal protocol choice) change over time. This capability may ensure that the system 400 remains effective even as network technologies, security threats, and data transmission patterns evolve. The algorithms may employ techniques such as adaptive windowing or ensemble methods specifically designed to detect and adapt to concept drift.

In some preferred embodiments, the system 400 may employee implement federated learning techniques, which may be optimal for multi-tenant systems or geographically distributed systems. This approach may allow the system 400 to learn from data across multiple sites or tenants without centralizing the data, which may be beneficial for privacy and regulatory compliance. Each site or tenant may train local models on their own data, with only model updates being shared and aggregated centrally. The system 400 may also incorporate transfer learning techniques, allowing it to apply knowledge gained from one network environment or data transmission scenario to others. This may be particularly useful when deploying the system 400 in new environments where historical data may be limited. By leveraging models trained on data from similar environments, the system 400 may achieve good performance more quickly than if it had to learn everything from scratch.

To ensure the reliability and safety of the machine learning-based protocol selection system, robust testing and validation procedures may be implemented. These may include techniques such as cross-validation, A/B testing, and gradual rollout of new models. The system 400 may also incorporate safeguards to prevent the machine learning component from making decisions that could potentially compromise security or severely degrade performance, such as imposing constraints on how frequently the protocol can be switched or requiring human approval for certain types of changes. For example, the system 400 may implement a multi-stage testing and validation process before deploying new machine learning models for protocol selection. In the first stage, the system 400 may use cross-validation techniques to assess the model's performance on historical data. This may involve dividing the historical dataset into multiple subsets, training the model on a portion of the data, and validating it on the remaining subset. This process may be repeated multiple times with different subsets to ensure the model's consistency and reliability across various data scenarios. In the second stage, the system 400 may conduct A/B testing by deploying the new model alongside the existing one in a controlled environment. A small percentage of live traffic may be routed through the new model, allowing for a direct comparison of its performance against the current system 400. Metrics such as transmission speed, security incident rates, and user experience may be closely monitored during this phase. If the new model demonstrates improved performance without any significant issues, the system 400 may proceed to a gradual rollout. This may involve incrementally increasing the percentage of traffic handled by the new model over a period of time, carefully monitoring its performance at each stage. Additionally, the system 400 may implement safeguards to prevent potential issues. For instance, it may set a maximum frequency for protocol switches, such as no more than once every 5 minutes, to avoid rapid oscillations that could degrade performance. The system 400 may also require human approval for certain high-risk changes, such as switching to HTTP for data that has been historically transmitted via HTTPS. These measures may help ensure that the machine learning component enhances the system's performance and security without introducing undue risks.

In a preferred embodiment, the system 400 may be utilized in various applications that require the transmission of large volumes of data over long distances with minimal latency. For instance, the system 400 may be employed in the field of medical imaging. In this context, the system 400 may be used to transmit high-resolution images or volumetric data from medical imaging devices, such as computed tomography (CT) scanners, magnetic resonance imaging (MRI) machines, or positron emission tomography (PET) scanners, to remote locations for analysis or diagnosis. The system's ability to transmit large volumes of data quickly and reliably may be particularly beneficial in telemedicine applications, where timely delivery and integrity of medical images can be critical to patient care. For example, in a rural hospital setting, a patient may require an urgent CT scan for a suspected stroke. The local hospital may have the necessary equipment to perform the scan but lack a specialist to interpret the results. Using the system 400, the CT images can be rapidly transmitted to a specialized stroke center in a major city. The high-resolution images, which may be several gigabytes in size, can be sent quickly and securely over long distances. This rapid transmission allows the remote specialist to review the images in near real-time, potentially within minutes of the scan being completed. The specialist can then provide an immediate diagnosis and treatment recommendations to the local medical team. In this scenario, the system's ability to transmit large medical imaging files quickly and reliably may significantly reduce the time to diagnosis and treatment, potentially improving the patient's chances of recovery. The system 400 may also allow for the transmission of follow-up scans or additional imaging studies as needed, facilitating ongoing remote monitoring and adjustment of the patient's treatment plan.

In other preferred embodiments, the system 400 may be used in streaming telecommunications, such as television broadcasting or video conferencing. The system 400 may be configured to transmit high-definition video streams over long distances with minimal latency, providing a smooth and high-quality viewing experience for end users 405. The system's ability to adapt to changing transmission priorities may also be beneficial in this context, as it may allow for dynamic adjustment of video quality or resolution based on network conditions or user preferences. For example, the system 400 may be utilized for remote surgical assistance and training. A leading surgeon in a major metropolitan hospital may use the system 400 to provide real-time guidance during a complex procedure being performed in a rural or underserved area. The system 400 may transmit high-definition, multi-angle video feeds of the operating room, along with vital patient data 430B and medical imaging, to the remote expert. The low-latency transmission may allow the expert to observe the procedure as it happens and provide immediate feedback or instructions to the local surgical team. The system's adaptive capabilities may automatically adjust the video quality to maintain a stable connection, ensuring that critical visual details are never lost due to network fluctuations. In cases where bandwidth becomes limited, the system 400 may prioritize the transmission of the most crucial video feeds and data streams, temporarily reducing the quality of less critical information. This application of the system 400 may significantly expand access to specialized surgical expertise, potentially improving patient outcomes in areas with limited local resources.

In another embodiments, the system 400 may be utilized in satellite communications. The system 400 may be used to transmit large volumes of data from satellites to ground stations, or vice versa. Given the long distances involved in satellite communications, the system's ability to minimize latency and maximize throughput may be particularly advantageous. The system's robust error handling capabilities may also be beneficial in this context, as satellite communications can be subject to various sources of interference or signal degradation. For example, in a combat scenario where a soldier sustains a severe injury, the system 400 may be used to transmit vital medical data from portable field diagnostic devices to a mobile field hospital or even to a specialized trauma center in a distant location. The system 400 may allow for the rapid transmission of high-resolution images from portable ultrasound devices, along with real-time vital signs and other critical patient data 430B. This immediate transfer of information may enable remote medical experts to provide instant guidance to field medics, potentially improving the chances of survival for critically wounded soldiers. The system's ability to maintain data integrity even in challenging network conditions may be particularly valuable in combat zones where communication infrastructure may be limited or compromised. Additionally, the system 400 may facilitate the coordination of medical evacuations by transmitting patient status updates and location data to incoming medevac teams, ensuring they are fully prepared upon arrival. This application of the system 400 in military medical operations may significantly enhance the speed and quality of battlefield medical care, potentially saving lives in high-stakes situations where every second counts.

In yet another preferred embodiment, the system 400 may be employed in drone technology. The system 400 may be used to transmit high-resolution video feeds, sensor data, or control commands between drones and ground control stations. The system's ability to handle high volumes of data and adapt to changing transmission priorities may be particularly useful in this context, as drones may need to transmit different types of data under varying operational conditions. For example, in emergency response scenarios, drones equipped with high-resolution cameras and medical sensors may be deployed to assess accident scenes or disaster areas. These drones may transmit real-time video feeds and environmental data to emergency medical teams, allowing them to prepare appropriate resources before arriving on site. In remote or hard-to-reach areas, drones may be used to deliver essential medical supplies, such as blood products, vaccines, or specialized medications. The system 400 may enable continuous communication between the drone and the control center, transmitting location data, payload information, and environmental conditions to ensure safe and accurate delivery. For example, in organ transplant situations, drones may be employed to transport organs swiftly between hospitals, with the system facilitating the transmission of time-sensitive organ viability data and tracking information to transplant teams. The system's ability to prioritize and adapt data transmission may be particularly crucial in these scenarios, ensuring that critical information is conveyed without delay while maintaining the integrity of less urgent but still important data streams.

In some preferred embodiments of the system 400, as illustrated in FIG. 7, users 405 are provided with the capability changing aspects of an original data block through an interactive user interface 411. This user interface 411 allows users 405 to modify various features of the data within the block, tailoring it to specific needs or preferences. The features that can be adjusted include, but are not limited to, text size, which allows users 405 to increase or decrease the font size for better readability or to fit more text within a given space. Users 405 can also modify the app size, which may involve resizing application windows or elements to optimize the layout for different screen sizes or resolutions. Additionally, other item sizes within the data block can be adjusted, providing flexibility in how content is displayed or interacted with. The system 400 also supports changes in display resolution, enabling users 405 to select the most appropriate resolution for their device or viewing preferences, which can enhance visual clarity or performance. Furthermore, users 405 can alter the orientation of the display, switching between portrait and landscape modes to suit the content being viewed or the device being used. This adaptability is particularly useful for devices that are frequently rotated, such as tablets or smartphones, ensuring that the content is always presented in the most effective manner. Overall, these customizable features empower users 405 to personalize their data blocks, enhancing usability and accessibility across a range of devices and applications. The system's user interface 411 is designed to be intuitive, allowing users 405 to make these adjustments easily and efficiently, thereby improving the overall user experience.

In yet other preferred embodiments, the system 400 may be used in other transmission environments that can be subject to extreme latency when transmitting data over large distances and/or require active communication request changes. These may include, but are not limited to, remote sensing applications, autonomous vehicle communications, high-frequency trading systems, or distributed computing networks. In these and other applications, the system's ability to minimize latency, maximize throughput, and adapt to changing transmission priorities may provide significant advantages over traditional data transmission methods. For example, an autonomous ambulance responding to an emergency call may utilize the system 400 to maintain constant, high-quality communication with multiple parties simultaneously. The ambulance may transmit real-time patient vital signs, high-resolution video feeds of the patient's condition, and detailed GPS location data to the receiving hospital. Concurrently, it may receive updated traffic information, optimal route suggestions, and remote medical guidance from emergency physicians. The system's low-latency capabilities may allow for near-instantaneous communication, which may be crucial in time-sensitive medical emergencies. If the patient's condition suddenly changes, the system 400 may automatically prioritize the transmission of critical medical data over less urgent information. In areas with poor network coverage, the system's adaptive protocols may ensure that essential communications are maintained even under challenging network conditions.

Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored in RAM. For instance, a display 316 may present a soft copy of tactile information via a haptic suit, wherein the hard copy of the tactile information is stored within a database 115. Displays 316 may include, but are not limited to, cathode ray tube monitors, LCD monitors, light emitting diode (LED) monitors, gas plasma monitors, screen readers, speech synthesizers, haptic feedback equipment, virtual reality headsets, speakers, and scent generating devices, or any combination thereof.

The database 115 may be operably connected to the processor 220 via wired or wireless connection. In a preferred embodiment, the database 115 is configured to store user data 430A, patient data 430B, and image data 430C within user profiles 430. Alternatively, the user data 430A, patient data 430B, and image data 430C may be stored within user profiles 430 on the non-transitory computer-readable medium 416. The database 115 may be a relational database such that the user data 430A, patient data 430B, and image data 430C associated with each user profile 430 within the plurality of user profiles 430 may be stored, at least in part, in one or more tables. Alternatively, the database 115 may be an object database such that user data 430A, patient data 430B, and image data 430C associated with each user profile 430 of the plurality of user profiles 430 may be stored, at least in part, as objects. In some instances, the database 115 may comprise a relational and/or object database and a server 110 dedicated solely to managing the user data 430A, patient data 430B, and image data 430C in the manners disclosed herein.

To prevent an un-authorized user from accessing other user's information, the system 400 may employ a security method. As illustrated in FIG. 8, the security method of the system 400 may comprise a plurality of permission levels 800 that may grant users access to user content 815, 835, 855 within the database 115 while simultaneously denying users without appropriate permission levels 800 the ability to view user content 815, 835, 855. To access the user content 815, 835, 855 stored within the database 115, users may be required to make a request via the user interface 411. Access to the data within the database 115 may be granted or denied by the processor 220 based on verification of a requesting user's permission level 800. If the requesting user's permission level 800 is sufficient, the processor 220 may provide the requesting user 805, 825, 845 access to user content 815, 835, 855 stored within the database 115. Conversely, if the requesting user's permission level 800 is insufficient, the processor 220 may deny the requesting user 805, 825, 845 access to user content 815, 835, 855 stored within the database 115. In an embodiment, permission levels 800 may be based on user roles 810, 830, 850 and administrator roles 870, as illustrated in FIG. 8. User roles 810, 830, 850 allow requesting users 805, 825, 845 to access user content 815, 835, 855 that a user has uploaded and/or otherwise obtained through use of the system 400. Administrator roles 870 allow administrators access system wide data.

In an embodiment, user roles 810, 830, 850 may be assigned to a user in a way such that a requesting user 805, 825, 845 may view user profiles containing user data 430A, patient data 430B, and image data 430C via a user interface.

To access the data within the database 115, a user may make a user request via the user interface 411 to the processor 220. In an embodiment, the processor 220 may grant or deny the request based on the permission level 800 associated with the requesting user 805, 825, 845. Only users having appropriate user roles 810, 830, 850 or administrator roles 870 may access the data within the user profiles. For instance, as illustrated in FIG. 8, requesting user 1 805 has permission to view user 1 content 815 and user 2 content 835 whereas requesting user 2 825 only has permission to view user 2 content 835. Alternatively, user content 815, 835, 855 may be restricted in a way such that a user may only view a limited amount of user content 815, 835, 855. For instance, requesting user 3 845 may be granted a permission level 800 that only allows them to view user 3 content 855 related to their specific healthcare records but not user 3 content 855 related to other their healthcare records. In the example illustrated in FIG. 8, an administrator 865 may bestow a new permission level 800 on users 405 so that it may grant them greater permissions or lesser permissions. For instance, an administrator 865 may bestow a greater permission level 800 on other users so that they may view user 3's content and/or any other user's content. Therefore, the permission levels 800 of the system 400 may be assigned to users in various ways without departing from the inventive subject matter described herein.

FIG. 9 depicts a flow diagram 900 illustrating steps for a method of sending and receiving large packets of information via the system 400. Step 905 indicates the beginning of the method. During step 910, the sending component 415A may receive a data transmission request from a computing entity 200. The data transmission request preferably pertains to a block of content to be transmitted. In some preferred embodiments, the data transmission request may include details about the content, such as its size, format, or priority level. The sending component 415A may analyze the request to determine the optimal transmission strategy. In some preferred embodiments, the sending component 415A may query the computing entity 200 for additional information if needed to process the request effectively. The data transmission request may be received through the command channel or through a separate control interface. Upon receiving the request, the sending component 415A may acknowledge receipt and begin preparing for transmission. In some preferred embodiments, the sending component 415A may perform initial checks to ensure it has the necessary resources and permissions to fulfill the request. The sending component 415A may also log the request details for record-keeping and performance analysis purposes.

During step 915, the sending component 415A may create a transmission recipe for the requested block of content. The transmission recipe may specify parameters for dividing and transmitting the content. In some preferred embodiments, the transmission recipe may include information such as the size and number of data elements to be created, the order in which they should be transmitted, and which transmission channels 415B to use for each element. The sending component 415A may consider factors like the total size of the content, available network bandwidth, and any priority levels specified in the transmission request when creating the recipe. In some preferred embodiments, the transmission recipe may also include error correction codes or redundancy measures to help ensure successful transmission. The recipe may be dynamically adjusted based on real-time network conditions or changes in transmission priorities. The sending component 415A may store the transmission recipe for later reference and may also transmit it to the receiving component 415C to guide the reassembly process.

Step 920 may involve the sending component 415A dividing the block of content into multiple data elements according to the transmission recipe. In some preferred embodiments, the sending component 415A may analyze the transmission recipe to determine how to divide the content. The data elements may be of varying sizes based on factors specified in the recipe, such as network conditions or content characteristics. In some preferred embodiments, the sending component 415A may employ different division strategies for different types of content. For example, text-based content may be divided differently than image or video content. The sending component 415A may also incorporate error correction codes or redundancy into the data elements as specified by the recipe. In some preferred embodiments, the division process may be dynamic, with the sending component 415A adjusting the size or number of data elements in real-time based on feedback from the receiving component 415C or changes in network conditions. The sending component 415A may also prioritize certain portions of the content for earlier transmission by dividing them into smaller or more numerous data elements. In some preferred embodiments, the division process may include compression of the data elements to further optimize transmission efficiency.

In step 925, the sending component 415A may transmit the data elements and transmission recipe via multiple parallel transmission channels 415B using TCP/IP. The parallel channels may include at least one command channel for instructions and at least two data transmission channels 415B for content. In some preferred embodiments, the sending component 415A may utilize the command channel to transmit control information or metadata related to the data transmission. The data transmission channels 415B may be used to transmit the actual content divided into data elements. In some preferred embodiments, the sending component 415A may implement load balancing techniques to distribute the data elements across the available transmission channels 415B efficiently. The sending component 415A may also employ adaptive algorithms to adjust the allocation of data elements to channels based on real-time network conditions. In some preferred embodiments, the sending component 415A may use different transmission strategies for different types of data elements, such as prioritizing certain elements for faster transmission. The sending component 415A may also incorporate error detection and correction codes into the transmitted data to improve reliability. In some preferred embodiments, the sending component 415A may compress the data elements before transmission to optimize bandwidth usage. The sending component 415A may also encrypt sensitive data elements to ensure security during transmission. In some preferred embodiments, the sending component 415A may implement a sliding window protocol to manage flow control and congestion avoidance across the parallel channels. The sending component 415A may also use techniques like pipelining to improve transmission efficiency by sending multiple data elements before receiving acknowledgments.

Step 930 may involve the receiving component 415C receiving the transmitted data elements and transmission recipe via the parallel channels. In some preferred embodiments, the receiving component 415C may process the incoming data streams from multiple channels simultaneously. The receiving component 415C may utilize the command channel to receive control information or metadata related to the transmission. In some preferred embodiments, the receiving component 415C may implement buffering techniques to manage the incoming data elements efficiently. The receiving component 415C may also employ error detection mechanisms to identify any corrupted or missing data elements. In some preferred embodiments, the receiving component 415C may send acknowledgments back to the sending component 415A for successfully received data elements. The receiving component 415C may also use the transmission recipe to verify that all expected data elements have been received. In some preferred embodiments, the receiving component 415C may decrypt any encrypted data elements upon receipt. The receiving component 415C may also decompress data elements if compression was used during transmission. In some preferred embodiments, the receiving component 415C may perform preliminary processing on received data elements even before the entire block of content has been transmitted. The receiving component 415C may also implement flow control mechanisms to manage the rate at which it receives data from the sending component 415A. In some preferred embodiments, the receiving component 415C may dynamically adjust its receiving parameters based on current system resources and network conditions.

In step 935, the receiving component 415C may reassemble the received data elements based on the transmission recipe to reconstruct the original block of content. In some preferred embodiments, the receiving component 415C may analyze the transmission recipe to determine the correct order and arrangement of the data elements. The receiving component 415C may then use this information to reassemble the data elements into their original form. In some preferred embodiments, the reassembly process may involve reordering out-of-sequence data elements, eliminating duplicate elements, and requesting retransmission of any missing elements. The receiving component 415C may employ various algorithms and techniques to efficiently reconstruct the original content, potentially utilizing parallel processing to handle multiple data streams simultaneously. In some preferred embodiments, the receiving component 415C may perform integrity checks during reassembly to ensure the accuracy of the reconstructed content. The reassembly process may also involve decompression or decryption of data elements if such techniques were used during transmission. In some preferred embodiments, the receiving component 415C may begin preliminary processing or analysis of partially reassembled content even before the entire block has been fully reconstructed, which may be beneficial for certain applications requiring real-time data processing. Once the block has been reconstructed, the method may proceed to terminate method step 940.

In some embodiments, the method may further comprise steps that allow for efficient transmission of large data volumes with minimal latency. For instance, the method may include additional steps for handling transmission scenarios such as out-of-order elements, duplicates, or missing elements. The method may be implemented over protocols like HTTP/HTTPS and may be applicable to fields such as medical imaging, streaming media, satellite communications, and drone technology that involve transferring large data sets over long distances. In some preferred embodiments, machine learning algorithms may be employed to optimize aspects of the transmission process based on historical performance data. The method may also include steps for dynamically adjusting the number and allocation of parallel transmission channels 415B based on factors like data volume, network conditions, and transmission priorities. In some preferred embodiments, the method may incorporate error correction techniques to improve data integrity during transmission. The method may also include steps for encrypting sensitive data elements before transmission and decrypting them upon receipt.

In certain preferred embodiments, the method may allow for simultaneous transmission of multiple blocks of content by intelligently distributing them across the available parallel channels. The method may also include steps for compressing data elements before transmission to further optimize bandwidth usage. In some preferred embodiments, the method may incorporate adaptive protocol switching to select the most appropriate transmission protocol based on current network conditions and data characteristics. The method may also include steps for prioritizing certain data elements for faster transmission based on their importance or time-sensitivity. In some preferred embodiments, the method may allow for partial reassembly and utilization of received data elements before the entire block of content has been transmitted, which may be beneficial for streaming applications. The method may also include steps for logging and analyzing transmission performance metrics to continually refine and improve the transmission process over time.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What we claim is:

1. A system for transferring data, comprising:
   a plurality of parallel transmission channels configured to transmit a block of content over a network,
      wherein said plurality of parallel transmission channels comprise at least one command channel and at least two data transmission channels,
      wherein said at least one command channel is configured to transmit a transmission recipe,
      wherein said at least two data transmission channels are configured to transmit said block of content, and
      wherein said transmission recipe dictates how said block of content is divided into smaller data elements for transmission via said at least two data transmission channels;
   a sending component operably connected to said plurality of parallel transmission channels via said network,
      wherein said sending component is configured to receive a data transmission request from a computing entity operably connected to said sending component,
      wherein said data transmission request pertains to said block of content,
      wherein said sending component creates said transmission recipe for said block of content when said data transmission request is received,
      wherein said sending component divides said block of content into a plurality of data elements according to said transmission recipe, and
      wherein said sending component concurrently transmits said plurality of data elements and said transmission recipe via said plurality of parallel transmission channels using TCP/IP; and a receiving component operably connected to said plurality of parallel transmission channels and said sending component via said network, wherein said receiving component is configured to receive said plurality of data elements and said transmission recipe via said plurality of parallel transmission channels, wherein said transmission recipe specifies a correct order and arrangement of said plurality of data elements, and wherein said receiving component reassembles said plurality of data elements based on said transmission recipe to reconstruct said block of content.

2. The system of claim 1, wherein the sending component is further configured to receive a notification that a current transmission is no longer required.

3. The system of claim 1, wherein the sending component is further configured to adapt to transmit new requested data in response to the notification.

4. The system of claim 1, wherein the sending component is configured to transmit the plurality of data elements in parallel over the at least two data transmission channels without waiting for confirmation of receipt before sending subsequent data elements.

5. The system of claim 1, wherein the receiving component is further configured to manage receipt of data elements out of order.

6. The system of claim 1, wherein the receiving component is further configured to manage receipt of duplicate data elements.

7. The system of claim 1, wherein the receiving component is further configured to address missing data elements.

8. A non-transitory computer-readable medium having instructions stored thereon that, when executed by a processor, cause a processor to perform operations for transferring data, the operations comprising:

receiving, at a sending component, a data transmission request from a computing entity, wherein said data transmission request pertains to a block of content that is to be transmitted from said sending component to a receiving component via a plurality of parallel transmission channels operably connected to said sending component and said receiving component, wherein said plurality of parallel transmission channels is configured to transmit a block of content over a network, creating, at said sending component, a transmission recipe for said block of content;

dividing, at said sending component, said block of content into a plurality of data elements based on said transmission recipe;

transmitting, at said sending component, said plurality of data elements and the transmission recipe via said plurality of parallel transmission channels using TCP/IP;

receiving, at said receiving component, the plurality of data elements and the transmission recipe; and reassembling, at said receiving component, the plurality of data elements according to the transmission recipe to reconstruct the requested data.

9. The non-transitory computer-readable medium of claim 8, wherein the operations further comprise:

receiving, at said sending component, a notification that a current transmission is no longer required; and

adapting, at said sending component, to transmit new requested data in response to the notification.

10. The non-transitory computer-readable medium of claim 8, wherein the plurality of parallel transmission channels comprises at least two data transmission channels and a command channel for instructions.

11. The non-transitory computer-readable medium of claim 10, wherein transmitting the plurality of data elements comprises transmitting the plurality of data elements in parallel over the at least two data transmission channels without waiting for confirmation of receipt before sending subsequent data elements.

12. The non-transitory computer-readable medium of claim 8, wherein the operations further comprise:

managing receipt of data elements out of order;

managing receipt of duplicate data elements; and addressing missing data elements.

13. The non-transitory computer-readable medium of claim 12, wherein the operations are performed over HTTP and HTTPS protocols, and wherein the operations are used in at least one of: medical imaging, streaming telecommunications, satellite communications, and drone technology.

14. A method for transferring data comprising steps of:

receiving, at a sending component, a data transmission request;

creating, at said sending component, a transmission recipe for requested data;

dividing, at said sending component, the requested data into data elements according to the transmission recipe;

transmitting, at said sending component, the data elements and the transmission recipe via multiple parallel transmission channels using TCP/IP, wherein said multiple parallel transmission channels is configured to transmit a block of content over a network;

receiving, at a receiving component, the data elements and the transmission recipe; and reassembling, at said receiving component, the data elements according to the transmission recipe to reconstruct the requested data.

15. The method of claim 14, further comprising additional steps of:

receiving a notification that a current transmission is no longer required; and adapting to transmit new requested data in response to the notification.

16. The method of claim 14, wherein the multiple parallel transmission channels comprise at least two data transmission channels and a command channel for instructions.

17. The method of claim 16, wherein transmitting the data elements comprises transmitting the data elements in parallel over the at least two data transmission channels without waiting for confirmation of receipt before sending subsequent data elements.

18. The method of claim 14, further comprising additional steps of:

managing receipt of data elements out of order;

managing receipt of duplicate data elements; and addressing missing data elements.

19. The method of claim 14, wherein the method is performed over HTTP and HTTPS protocols.

20. The method of claim 19, wherein the method is used in at least one of: medical imaging, streaming telecommunications, satellite communications, and drone technology.

* * * * *